United States Patent [19]

Noristi et al.

[11] Patent Number: 5,244,854
[45] Date of Patent: Sep. 14, 1993

[54] COMPONENTS AND CATALYSTS FOR THE POLYMERIZATION OF OLEFINS

[75] Inventors: Luciano Noristi; Antonio Monte, both of Ferrara, Italy

[73] Assignee: Himont Incorporated, Wilmington, Del.

[21] Appl. No.: 856,775

[22] Filed: Mar. 24, 1992

[30] Foreign Application Priority Data

Mar. 27, 1991 [IT] Italy .................... 000814 A/91

[51] Int. Cl.$^5$ ............................... C08F 4/654
[52] U.S. Cl. ....................... 502/120; 502/115; 502/116; 502/121; 502/122; 502/123; 502/125; 502/126; 502/127; 502/133; 502/134; 526/125
[58] Field of Search ............... 502/120, 126, 133, 134, 502/115, 116, 121, 122, 123, 125, 127

[56] References Cited

U.S. PATENT DOCUMENTS 4,263,168  4/1981  Rochefort et al. ............ 502/115 X
5,064,799  11/1991 Monte et al. ................. 502/115
5,139,985  8/1992  Barbé et al. .................. 502/134 X

FOREIGN PATENT DOCUMENTS 1306044  2/1973  United Kingdom .
2028347  3/1980  United Kingdom .

Primary Examiner—Patrick P. Garvin

[57] ABSTRACT

Catalyst components for the polymerization of olefins, obtained by reacting a tetravalent titanium halide or halogen alcoholate and an electron-donor compound with a solid comprising a porous metallic oxide containing hydroxyl groups on the surface, on which is supported a magnesium dihalide or a magnesium compound which does not contain Mg-C bonds and can be transformed into a dihalide, characterized in that the quantity of Mg supported on the oxide prior to the reaction with titanium compound, and present in the catalyst component after the reaction with the Ti compound, is from 5% to 12% weight with respect to the weight of the catalyst component.

8 Claims, No Drawings

COMPONENTS AND CATALYSTS FOR THE POLYMERIZATION OF OLEFINS

The present invention relates to catalyst components for the (co)polymerization of $CH_2=CHR$ olefins, where R is hydrogen or a 1-6 carbon linear or branched alkyl radical or an aryl radical, and catalysts obtained therefrom.

The preparation of catalyst components comprising a titanium halide and Mg halides, by supporting the above mentioned titanium and magnesium halides on metal oxides such as silica and alumina or porous polymer supports, such as styrene-divinylbenzene resins, is known.

In particular, British patent GB-A-2,028,347 teaches how to prepare catalyst components supported on inert supports, such as silica and alumina, by impregnating said supports with $MgCl_2$ solutions, evaporating the solvent and reacting the solid product thus obtained with a transition metal compound, particularly titanium. The maximum amount of $MgCl_2$ deposited on the support prior to the reaction with the transition metal compound is 75% by weight, corresponding to 19% by weight of Mg. In this case the activity of the catalysts obtained from the above mentioned catalyst components, in relation to the Mg content, is such that it increases when the Mg content decreases, and starts to decrease when the Mg content goes below 2% by weight Maximum activity is achieved when the Mg content is from 2 to 3% by weight, and according to the examples about 5000 g of polyethylene/g of catalyst component per hour and ethylene atmosphere is obtained. Due to the absence of electron-donors in the supported component, the above catalysts are not suitable for obtaining highly stereoregular alpha-olefin polymers. Supported catalyst components obtained by impregnating a metal oxide such as silica and alumina, with an organometallic magnesium compound, selected in particular from the Mg-alkyl and Grignard compounds, and then reacting the support with a titanium halide compound, are known from British patent GB-A-1.306.044. The Mg content in the supported component thus obtained is about 4% by weight, as shown in the examples. The catalysts are used in the polymerization of ethylene, where, however, they do not give sufficiently high yields (500-1400 g polymer/g catalyst component per hour and operating with an ethylene pressure of 10 atm).

U.S. Pat. No. 4,263,168 describes catalyst components for the polymerization of propylene and other alpha-olefins, obtained by reacting a metal oxide, such as silica and alumina, containing hydroxyls on the surface, with an organometallic magnesium compound of the formula $MgR_{2-x}X_x$ (where R is a hydrocarbon radical; X is a halogen; x is a number from 0.5 to 1.5), and subsequent reaction with an electron-donor compound and titanium tetrachloride.

The organometallic magnesium compound is reacted in molar excess with respect to the hydroxyl groups, while the electrondonor compound is used in quantities up to 1 mole per mole of reacted magnesium compound, preferably 0.5 to 0.8 moles. The reaction with $TiCl_4$ is carried out preferably using an excess of $TiCl_4$.

As a variant, one can react the metal oxide, either before or after the reaction with the organometallic magnesium compound, with a halogenating agent which will supply at least one halogen atom per hydroxyl group The halogenating agent can be added also during the reaction with the electron-donor compound. The Mg content in the supported compounds described in the examples does not exceed 7%. The activity of catalysts obtained from the above mentioned catalyst components, however, is very low, i.e. in the order of tens of grams of polypropylene per gram of catalyst component at ambient pressure.

Magnesium halide based catalysts supported on porous supports, which have high activity and stereospecificity, besides reducing the content of undesired halogenated compounds which remain in the polymer, would allow, in a relatively simple manner, the control of the polymer morphology. In fact, in the modern industrial processes of polyolefin production there is a need for catalysts capable of producing a polymer with controlled morphologic characteristics (narrow particle size distribution and sufficiently high bulk density).

Published European patent application EP-A-344755, describes catalyst components obtained by supporting a Mg dihalide or Mg compounds which can then be transformed to dihalide on a porous polymer support, and then reacting the solid with a titanium halide or halogen alcoholate, optionally in the presence of an electron-donor compound. The Mg content in the catalyst components described in the examples is at the most 5.16% by weight The activity of the catalysts thus obtained does not exceed 4000 g polymer/g catalyst component in the case of polymerization of propylene where the titanium content in the catalyst component is 2%-3% by weight Said polymerization is carried out operating at about 7 atmospheres of propylene.

The examples also show that in the catalyst component the Ti/Mg ratio by weight varies from about 0 4 to 0.8.

Moreover, published European patent application EP-A-0434082 describes catalyst components comprising a porous metal oxide (for example silica or alumina) on which there are supported a magnesium dihalide, a titanium halide or halogen alcoholate, and an electron-donor selected from particular classes of ethers.

The examples show maximum yields of isotactic polypropylene of about 4,000 g/g catalyst component operating with about 7 atmospheres of propylene, and a yield of 14,000 g/g catalyst component operating in liquid propylene.

In this case, the high activity is due to the presence of the above mentioned ethers.

In the catalyst components of the examples the magnesium content is at the most 5.5% by weight, the titanium content varies from about 1.5% to 2.5% by weight and the Ti/Mg weight ratio varies from about 0.3 to 0.7.

U.S. Pat. No. 5,064,799 describes catalyst components obtained from the reaction of a tetravalent titanium halide and an electron-donor compound with a solid obtained by reacting a metal oxide containing hydroxyl groups on the surface (such as silica or alumina) with an organometallic Mg compound of the formula $MgR_{2-x}X_x$, where R is a hydrocarbon radical, X is a halogen or an OR or COX' radical (where X' is halogen) and x is a number from 0.5 to 1.5, used in amounts such as not cause reduction of titanium during the subsequent reaction of the solid with the titanium halide.

In the catalyst components of the examples, the maximum magnesium content is 10.65% by weight, the titanium content is from 2.5% to 5% by weight and the Ti/Mg weight ratio varies from about 0.3 to 1.5. The maximum yield in isotactic polypropylene is about 28000 g/g of catalyst component in liquid propylene.

Now unexpectedly it has been found that it is possible to obtain catalysts supported on metal oxides, which are particularly active in the polymerization of $CH_2=CHR$ olefins, where R is hydrogen or a 1-6 carbon alkyl radical or an aryl radical, in particular phenyl having high stereospecificity and capable of forming a polymer having a controlled morphology. These catalysts are prepared from catalyst components obtained by reacting a tetravalent titanium halide or halogen alcoholate and an electron-donor compound with a solid comprising a porous metal oxide containing hydroxyl groups on the surface, on which is supported a magnesium halide or a magnesium compound not containing Mg-C bonds, which can be transformed in dihalide, said catalyst components being characterized in that the Mg content supported on the metal oxide, prior to the reaction with the titanium compound, and present in the final catalyst component after the reaction with the titanium compound, is from 5% and 12% by weight, preferably from 6% to 12% by weight, more preferably from 7.5% and 12% by weight, with respect to the catalyst component. The performances of the catalysts prepared from these catalyst components are unexpected because, based on previous knowledge, it could not be foreseen that the maximum performance in terms of activity and morpholofic properties of the polymer, could be obtained with contents of Mg from 5 to 12% by weight In particular, the above result is surprising since the catalyst components of the present invention are capable of giving yields in isotactic polypropylene considerably higher than the catalyst obtained with the catalyst components described in U.S. Pat. No. 5,064,799, although the titanium content and Ti/Mg ratio are entirely comparable.

According to the present invention, the quantity of Mg supported on the porous metal oxide, prior to the reaction with the titanium compound, is preferably selected in such a way that the Mg compound deposited on the porous support corresponds, as volume, to the porosity of the support. Mg compound contents higher than the porosity of the support, produce catalysts which form polymers with unsatisfactory morphologic properties.

In the catalyst components the Mg/Ti ratio is from 0.5:1 to 30:1, preferably from 3:1 to 20:1; the Ti compound/electron-donor mole ratio is from 0.3:1 to 8:1.

The metal oxide has preferably a porosity (B.E.T ) higher than 0.3 ml/g, usually from 0.5 to 3.5 ml/g, for example from 1 and 3 ml/g. The surface area (B.E.T.) is usually from 30 to 1000 m$^2$/g.

Any metal oxide containing surface hydroxyls can be used. The preferred ones are silica, alumina, magnesium oxide, magnesium silicates, titanium oxide, thorium oxide, and silicaalumina mixed oxides. Silica, alumina and silica-alumina mixed oxides are the preferred oxides The quantity of hydroxyl groups present in the oxides can be 3 mmoles per g of oxide or more.

Preferably, in the case of silica and other oxides different from alumina, in addition to the hydroxyl groups, also chemically uncombined water is present in quantities up to 0.015 moles per g of oxide.

The quantity of chemically uncombined water can be regulated by subjecting the oxides to heating at a temperature from 150° to 250° C.; the quantity of hydroxyl groups is regulated by subjecting the oxides to heating at a temperature from 150° to 800° C. The higher the treatment temperature, the lower the content of hydroxyl groups present.

The chemically uncombined water is added in various ways; one of the preferred methods consists in allowing a damp nitrogen current to flow over the oxide as is, or which has been previously anhydrated.

High calcination temperatures (700°-800° C.) have a negative effect on the morphologic properties of the polymer. It has been found that adding alcohols, such as ethanol or butanol, in quantities up to 1 mole per mole of magnesium compound, during the step where the magnesium compound is supported on the metal oxide, has beneficial effect on the morphology of the polymer. In particular, it allows the restoration, in the case of catalysts obtained by oxides calcinated at high temperature, of the morphology typical of the catalysts prepared from oxides, which contain not chemically combined water, or which have been subjected to calcination treatments at a temperature lower than 600°-700° C.

The amount of hydroxyls groups is preferably from 1 to 3 mmoles per g of oxide/ and of water, when present, is preferably from 1-10 mmole per g of oxide The amount of hydroxyl groups present in the metal oxide is determined by titration according to the method described in J. Phys. Chem., Vol. 66,800 (1962) and the amount of water present with the Fisher reactor.

The preparation of catalyst components of the present invention can be carried out by suspending the metal oxide in a solution of a magnesium dihalide or magnesium compound which can be transformed into a dihalide, and then evaporating the solvent, or by adding the magnesium dihalide or magnesium compound solution to the solid dropwise until the solid remains flowable; the procedure can be repeated a number of times The operating temperature is usually from 0° C. to 150° C.

The impregnation of the oxide can also be carried out in a fluid bed, thus maintaining the impregnated solid flowable.

An example of the magnesium compounds which can be used and differ from the dihalides include alkyl-Mg-halides, Mg-dialkyls, alkyl-Mg-alcoholates, Mg-dialcoholates, Mg-halogen-alcoholates, Mg-dicarboxysilates, Mg-halogen-carboxylates and Mg-alkylcarbonates.

These compounds are usually dissolved in aliphatic or aromatic hydrocarbons, or in ethers. Some of these compounds can be formed in situ.

The magnesium halides are dissolved in solvents such as alcohols, ethers, ketones and esters. In this case the magnesium halide is present in the oxide in the form of a complex with the solvent.

Preferred magnesium compounds are $MgCl_2$, $RMgCl$, $RMgBr$, $MgR_2$, $Mg(OR')_2$, $ClMgOR'$, $BrMgOR'$, $Mg(OCOR)_2$, $RMgOR$ and $mMg(OR)_2$-$pTi(OR)_4$, where R is a $C_{1-20}$ alkyl, $C_{3-20}$ cycloalkyl or $C_{6-20}$ aryl radical, and R' having the same meaning as R or being —$Si(R)_3$; m and p are numbers from 1 to 4.

When the supports contain magnesium compounds which are already halogenated and do not contain Mg-C bonds, the catalyst component is obtained by reacting said support with a titanium halide or halogen alcoholate in excess, preferably TiCl$_4$, and an electron-donor compound, at temperatures from 0° C. to 135° C. The solid is separated hot from the excess of the titanium compound and washed with anhydrous hexane or heptane until all the chlorine ions disappear from the filtrate. The treatment with the titanium compound can be repeated When the metal oxide support is impregnated with magnesium compounds containing Mg—C bonds, in particular Mg-alkyl bonds, in order to have a high activity of the catalysts, it is necessary to transform said magnesium compounds, prior to the reaction with the titanium compound, into magnesium dihalides or into compounds which are no longer capable of reducing the tetravalent titanium (i.e. they do not contain Mg—C bonds), and can be transformed into magnesium dihalides by reaction with the titanium halide or halogen alcoholate. To accomplish this purpose the metal oxide support containing the Mg compound with Mg-C bonds is reacted with compounds such as HCl, SiCl$_4$, chlorosilanes, HSiCl$_3$, Al-alkyl halides, water, alcohols, carboxylic acids, orthoesters, esters, aldehydes, ketones and carbon dioxide.

These compounds are reacted in stoichiometric amounts, or in excess, with respect to the Mg—C bonds, usually operating at temperatures from 0° C. to 150° C.

The electron-donor compound can also be reacted before or after the treatment with the Ti compound. When it is reacted after treatment with Ti compound, it is convenient to carry out the reaction in an aromatic hydrocarbon medium, such as benzene or toluene, or in a halogenated hydrocarbon, such as dichloroethane.

The best results, however, are obtained by reacting the electron-donor compound before or at the same time as the titanium compound. The preferred titanium compounds are the halides, particularly TiCl$_4$.

Any electron-donor compound capable of forming complexes with the magnesium halides and/or the tetravalent titanium halides or halogen alcoholates can be used for the preparation of the catalyst component of this invention. Examples of compounds which can be used are esters, ethers, ketones, lactones, compounds containing N, P and/or S atoms. Preferred compounds among the esters are carboxylic aromatic acids esters, such as phthalic acid, and malonic, pivalic, succinic and carbonic acid esters.

Particularly suited are the ethers described in published European patent EP-A-361494 (corresponding to U.S. Pat. No. 4,971,937) having the formula:

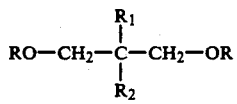

where R, R$_1$ and R$_2$ are the same or different and are C$_{1-18}$ linear or branched alkyl, C$_3$–C$_{18}$ cycloalkyl, C$_6$–C$_{18}$ aryl, C$_7$–C$_{18}$ alkaryl or aralkyl groups, and R$_1$ or R$_2$ can also be hydrogen. In particular, R is methyl and R$_1$ and R$_2$ are the same or different and are ethyl, propyl, isopropyl, butyl, isobutyl, tert-butyl, neopentyl, isopentyl, phenyl, benzyl or cyclohexyl Representative examples of said ethers are 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2,2-bis(cyclohexyl)-1,3-dimethoxypropane.

Specific examples of esters are diisobutyl, dibutyl, dioctyl and diphenyl phthalate, benzylbutyl phthalate, diisobutyl and diethyl malonate, ethyl pivalate, ethylphenyl carbonate and diphenyl carbonate.

The catalyst components of the present invention, together with Al-alkyl compounds, preferably Al-trialkyls, form catalysts suitable for the polymerization of CH$_2$=CHR olefins, where R is hydrogen or an alkyl radical with 1-6 carbon atoms, or an aryl, and mixtures thereof optionally containing minor proportions of diene.

Representative examples of Al-trialkyl compounds are Altriethyl, Al-triisobutyl, Al-tri-n-butyl and linear or cyclic compounds containing two or more Al atoms bridge bonded through O or N atoms, or SO$_4$ and SO$_3$ groups.

Aluminum dialkyl halides can also be used in the mixture with Al-trialkyls. The Al-alkyl compound is used in an Al/Ti ratio generally from 1 to 1000.

When an ether selected from the ones described in published European patent application EP-A-361494 is present as electron donor in the catalyst component of the present invention, the stereospecificity of the catalyst is sufficiently elevated, so that it is not necessary to use an electron-donor compound together with the Al-alkyl compound. In all other cases, in order to improve the stereospecificity of the catalyst, it is convenient to use, together with the Al-alkyl compound, also electron-donor compound in a quantity equal to 0.01-0.25 mol ®s per mole of Al-alkyl compound The electron-donor compound to be used together with the Al-alkyl compound is selected preferably among the ethers, esters, silicon compounds containing at least one Si-OR bond (R is a hydrocarbon radical) and 2,2,6,6,-tetramethylpiperidine.

When the solid catalyst component comprises a bicarboxylic aromatic acid ester, such as phthalic acid, or an ester of malonic, maleic, pivalic, succinic or carbonic acid, the electron-donor compound to be used together with the Al-alkyl compound is preferably selected from silicon compounds containing at least one Si-OR bond.

Examples of said silicon compounds are phenyltriethoxysilane, diphenyldimethoxysilane, dicyclopentyldimethoxysilane, methyl-tert-butyldimethoxysilane, methylcyclohexyldimethoxysilane, di-tert-butyl-dimethoxysilane, iso-propyl-tert-butyl-dimethoxysilane.

The polymerization of olefins is carried out according to known methods, operating in liquid phase, in liquid monomer or in a solution of the monomer in an inert hydrocarbon solvent, or in gas phase, or even by combining the gas phase and liquid phase polymerization stages.

The polymerization temperature is generally from 0° to 150° C., preferably from 60° C. to 100° C. The operation takes place at atmospheric pressure or higher.

The catalysts of the present invention are used both in the homopolymerization and copolymerization of olefins They are particularly useful in the preparation of random crystalline copolymers of propylene with minor proportions of ethylene, and optionally of butene and higher α-olefins, and of elastomeric copolymers of ethylene with propylene, optionally containing minor proportions of a diene (such as butadiene and hexadiene-1,4). The catalysts of the present invention can also be used in the sequential polymerization of propylene and its mixtures with ethylene and/or butene and superior α-olefins to form impact polypropylene.

Prior to polymerization, the catalyst can be precontacted with small amounts of olefin monomer (prepolymerization) operating either in suspension in a hydrocarbon solvent (for example hexane and heptane) and polymerizing at temperatures from ambient to 60° C., thus producing a quantity of polymer 0.5-10 times the weight of the solid catalyst component, or operating in liquid monomer, thus producing quantities of polymer up to 1000 g per g of solid component.

The following examples are given to illustrate and not limit the invention.

EXAMPLE 1

A) Preparation of MqCl₂ solution in THF

Into a 1.5 dm³ flask equipped with an agitator and coolant, are introduced 40 g of anhydrous $MgCl_2$ and 1000 cm³ of tetrahydrofurane (THF). Using a thermoregulated bath, the temperature is raised to the THF reflux point and maintained for 72 hours. The solution thus obtained is cooled to room temperature and then filtered.

The Mg atomic absorption analysis indicates a concentration of 3.9 g of $MgCl_2$ per 100 cm³ of solution.

B) Impregnation of the silica

Into a 250 cm³ flask connected to a rotating evaporator (Rotavapor) are introduced 7 g of Grace-Davison 952 spheroidal $SiO_2$ which has not been subjected to thermal or chemical pretreatments. The content of not chemically combined water is about 2.4 mmoles/g. The thermoregulated bath is brought to 60° C. and 20.5 cm³ of the $MgCl_2$ solution described above are then introduced.

After one hour of mixing, the solvent is evaporated. The procedure is repeated five times The quantity of $MgCl_2$ introduced in this manner is equal to 6 mmoles per g of $SiO_2$.

Then the support is dried under vacuum at 60° C. for 3 hours. The composition of the solid support obtained is reported in Table 1A.

C) Preparation of the catalyst component 7 g of the solid support prepared above together with 200 cm³ of $TiCl_4$ are introduced into a 350 cm³ reactor, equipped with thermoregulated jacket and a bottom filtering septum. The temperature is brought quickly to 70° C. under agitation, then 2-isopropyl-2-isopentyl-1,3-dimethoxypropane (DMP) is introduced in such a quantity as to have a 1:3 the molar ratio with respect to the Mg contained in the support to 1 3. The temperature is then brought to 100° C and maintained for 2 hours. The reaction mixture is then filtered hot, after which the reaction of the filtered solid with $TiCl_4$ is carried out (titanation) by introducing the filtered solid and 200 cm³ of fresh $TiCl_4$ into the reactor, by bringing the temperature again to 100° C. and maintaining for 2 hours. Finally the $TiCl_4$ is filtered, the solid is washed with hexane twice at 60° C., and 3 times at ambient temperature, then it is dried under a $N_2$ flow for 2 hours at 70° C. The analysis of the catalyst component thus obtained is reported in Table 1A.

D) Polymerization of propylene

Into a 4 dm³ autoclave, equipped with an agitator and a thermostat, are introduced, at 30° C. and under light propylene flow, 75 cm³ of hexane containing 7 mmoles of $Al(C_2H_5)_3$(TEA), and the catalyst component prepared above (in the quantity specified in Table 1B), previously mixed for 5 minutes. The autoclave is closed, and 1.6 Ndm³ of hydrogen are introduced, then the agitator is started, and 1;2 kg of propylene are introduced, the temperature is rapidly brought to 70° C. and the autoclave is maintained under these conditions for two hours. The agitation is then stopped, the nonreacted propylene is removed and the autoclave is cooled to room temperature. The polymer obtained is dried at 70° C. for 3 hours under nitrogen flow, weighed and analyzed The yield is expressed in kg of polymer per g of catalyst component. The isotacticity is measured as % of polymer insoluble in xylene at 25° C. The melt index and bulk density are determined according to ASTM methods D-1238 (condition L) and D-1985 respectively. The polymerization results are reported in Table 1B.

EXAMPLES 2-3

The procedure and ingredients of Example 1, are used except that in the impregnation step one uses the amount of $MgCl_2$ per g of $AlO_2$ is as indicated in Table 1A.

The compositions of the catalyst component are reported in Table 1A and the polymerization results in Table 1B.

EXAMPLE 4

The procedure and $MgCl_2/SiO_2$ ratio of Example 3 are used, except that the impregnation is done in one step, by maintaining the silica in contact with the $MgCl_2$ solution at 60° C. for 4 hours, then evaporating the solvent, and finally drying the catalyst under vacuum. The composition of the catalyst component and polymerization results are reported in Tables 1A and 1B respectively.

EXAMPLE 5

The same procedure in Example 4 is followed, but in this case the silica used has been previously calcinated for 7 hours at 800° C. The composition of the catalyst component and the polymerization results are shown in Tables 1A and 1B respectively.

EXAMPLE 6

The procedure and ingredients of Example 5 are used, except that 0.8 moles of $C_2H_5OH$/mole of $MgCl_2$ are added to the $MgCl_2$ solution in THF. The results reported in Table 1A and 1B demonstrate that the addition of $C_2H_5OH$ has the effect of restoring the spheroidal morphology typical of Examples 1-4 even by using calcinated silica.

EXAMPLE 7

The catalyst is prepared according to the procedure described in Example 4, except that the support of Ketjen grade B alumina produced by AKZO, which has been previously calcinated for 7 hours at 800° C., is used. The composition of the catalyst component and the polymerization results are reported in Tables 1A and 1B and are similar to those obtained with $SiO_2$. The morphology of the polymer is spheroidal even without the addition of $C_2H_5OH$ to the $MgCl_2$ solution.

EXAMPLE 8

The procedure and ingredients of Example 4 are used except that instead of using the $MgCl_2$ in THF solution, $ClMgOC_2H_5$ is used in the same solvent, prepared by reacting a 3M solution of $CH_3MgCl$ in THF with $C_2H_5OH$ in a molar ratio of $C_2H_5OH/Mg = 1/1$.

The composition of the catalyst component and the polymerization results are reported in Tables 2A and 2B.

EXAMPLE 9

The procedure and ingredients of Example 8 are used except that the Mg compound used for the impregnation of the SiO$_2$ is C$_6$H$_{13}$MgOC$_2$H$_5$ obtained by reacting, in a 1:1 molar ratio, a heptane solution of Mg(C$_6$H$_{13}$)$_2$ with C$_2$H$_5$OH.

The amount of Mg compound used and the composition of the catalyst are reported in Table 2A, the results of the propylene polymerization are reported in Table 2B.

EXAMPLE 10

In the apparatus used for Example 1 are introduced 7 g of SiO$_2$(GRACE DAVISON, type 952), and 18.7 cm$^3$ of a 3M solution of CH$_3$MgCl in THF (equal to 10 mmoles of Mg per g of SiO$_2$). The solution is mixed with the silica at 60.C for 1.5 hours, after which all the solvent is evaporated and 70 mmoles of C2H5OH dissolved in n-hexane are introduced. The mixture is allowed to react at 60.C for 1.5 hours, the solvent is then evaporated and the support is dried under vacuum.

The preparation of the catalyst and the polymerization of the propylene are carried out as in Example 1. The results are reported in Tables 2A and 2B.

EXAMPLE 11

Into the same apparatus used for Example 1 are introduced 7 g of SiO$_2$, after which 4.1 cm$^3$ 70 mmoles of C$_2$H$_5$OH diluted in 5 cm$^3$ of n-hexane are fed dropwise, thus obtaining a solid which is still flowable.

After 1 hour of contacting, 23.4 cm$^3$ (70 mmoles) of a 3M solution of CH$^3$MgCl in THF are gradually added, the content is left at ambient temperature for 30 minutes, then the temperature is increased to 60° C. and maintained at that level for 1.5 hours. Then the solvent is evaporated and the solid dried at 60° C. under vacuum for 3 hours.

The synthesis of the catalyst and the polymerization are carried out according to the procedure of Example 1. The results are reported in Table 2A and 2B.

EXAMPLE 12

The procedure and the ingredients of Example 10 are used except that instead of CH$_3$MgCl in THF, a solution of Mg(C$_6$H$_{13}$)$_2$ in heptane (10 mmoles/g SiO$_2$) is used for the impregnation, and the quantity of C$_2$H$_5$OH used in the second step is double compared to what was used in Example 10 (140 instead of 70 mmoles).

The preparation of the catalyst and the polymerization are carried out as in Example 1. The results are reported in Tables 2A and 2B.

EXAMPLE 13

In a 0.350 dm$^3$ glass reactor equipped with a thermoregulated jacket, an agitator and a coolant, are introduced 7 g of SiO$_2$ (GRACE DAVISON 952) suspended in 40 cm.$^3$ of hexane. While maintaining the suspension under agitation, 40 cm$^3$ (56 mmoles) of a hexane solution of butylethylmagnesium (BEM manufactured by TEXAS ALKYLS) are added dropwise.

The suspension is maintained at reflux for 1 hour and then the solvent is evaporated and a drying is carried out until a flowable solid is obtained. The latter is suspended in the same reactor in 50 cm$^3$ of hexane. Approximately 10 liters of dry gaseous HCl are then bubbled through the suspension for 2 hours. Afterwards, the solvent is evaporated and the solid is dried. The solid support is then treated with TiCl$_4$ and electron-donor compound according to the procedure and ingredients of Example 1.

The catalyst analysis is reported in Table 2A. The polymerization results are reported in Table 2B.

COMPARATIVE EXAMPLE 1

The preparation of the catalyst component is carried out as per Example 1, but during the impregnation phase the quantity of MgCl$_2$ per g of SiO$_2$ used is the one indicated in Table 2A.

The composition of the catalyst component is reported in Table 2A and the polymerization results in Table 2B.

TABLE 1A

| | | | PREPARATION OF THE CATALYST COMPONENT | | | | | | | | | |
|---|---|---|---|---|---|---|---|---|---|---|---|---|
| | | | IMPREGNATION | | SUPPORT COMPOSITION (wt. %) | | | CATALYST COMPONENT COMPOSITION (wt. %) | | | | |
| Ex. | OXIDE | | Compounds and order | Mg mmoles | | | | | | | Donor | |
| No. | Type | Pre-Treatment | in which they were added | g Oxide | Mg | Cl | THF | Ti | Mg | Cl | Type | % |
| 1 | SiO$_2$ | — | MgCl$_2$ | 6 | 6.15 | 18.4 | 21.0 | 3.8 | 6.4 | 27.8 | DMP[(1)] | 4.0 |
| 2 | " | — | " | 8 | 7.65 | 22.5 | 26.0 | 3.9 | 7.4 | 30.9 | " | 6.1 |
| 3 | " | — | " | 12 | 7.6 | 24.9 | 31.0 | 3.75 | 9.7 | 36.1 | " | 7.4 |
| 4 | " | — | " | 12 | 7.95 | 23.9 | 31.4 | 4.75 | 9.2 | 36.0 | " | 3.5 |
| 5 | " | 800° C., 7 hours | " | 10 | 7.1 | 21.3 | 33.0 | 2.95 | 8.8 | 33.7 | " | 7.2 |
| 6 | " | " " | MgCl$_2$ + EtOH (EtOH/Mg = 0,8) | 10 | 7.5 | 21.85 | 28.0 | 3.2 | 9.0 | 35.0 | " | 7.0 |
| 7 | Al$_2$O$_3$ | " " | MgCl$_2$ | 8 | 7.3 | 22.15 | 31.0 | 3.2 | 8.85 | 34.9 | " | 7.0 |

[(1)]= 2-isopropyl-2-isopentyl-1,3-dimethoxypropane

TABLE 2A

| | | | PREPARATION OF THE CATALYST COMPONENT | | | | | | | |
|---|---|---|---|---|---|---|---|---|---|---|
| | | | IMPREGNATION | | SUPPORT COMPOSITION (wt. %) | CATALYST COMPONENT COMPOSITION (wt. %) | | | | |
| Ex. | OXIDE | | Compounds and order | Mg mmoles | | | | | Donor | |
| No. | Type | Pre-Treatment | in which they were added | g Oxide | Mg—Cl—EtOH—THF | Ti | Mg | Cl | Type | % |
| 8 | SiO$_2$ | — | Mg(OEt)Cl | 8 | 8.85—14.45—16—6.9 | 3.75 | 8.5 | 33.8 | DMP | 6.2 |
| 9 | " | — | Mg(OEt)(esil) | 10 | 8.35 / 16.8—0.0 | 4.7 | 8.15 | 32.8 | " | 8.5 |

TABLE 2A-continued

PREPARATION OF THE CATALYST COMPONENT

| Ex. No. | OXIDE Type | OXIDE Pre-Treatment | IMPREGNATION Compounds and order in which they were added | Mg mmoles g Oxide | SUPPORT COMPOSITION (wt. %) Mg—Cl—EtOH—THF | CATALYST COMPONENT COMPOSITION (wt. %) Ti | Mg | Cl | Donor Type | % |
|---|---|---|---|---|---|---|---|---|---|---|
| 10 | " | — | MeMgCl + EtOH (EtOH/Mg = 1:1) | 10 | 8.95—14.4 17.5—6.0 | 4.05 | 8.0 | 33.2 | " | 6.4 |
| 11 | " | — | EtOH + MeMgCl (EtOH/Mg = 1:1) | 10 | 8.70—14.4 16.3—5.0 | 3.85 | 8.35 | 34.9 | " | 5.0 |
| 12 | " | — | Mg(esil)$_2$ + EtOH (EtOH/Mg = 2:1) | 10 | 9.0 / 29.8 / | 4.15 | 8.8 | 35.8 | " | 8.0 |
| 13 | " | — | MgEt(Bu) + HCl gas | 8 | not analyzed | 4.05 | 8.0 | 32.8 | " | 5.6 |
| 1 cfr | " | — | MgCl$_2$ | 3 | 4.25 11.7 8.6 | 5.35 | 3.8 | 19.6 | " | 2.8 |

TABLE 3A

PREPARATION OF THE CATALYST COMPONENT

| Ex. No. | OXIDE Type | OXIDE Pre-Treatment | IMPREGNATION Compounds and order in which they were added | Mg mmoles g Oxide | SUPPORT COMPOSITION (wt. %) Mg | Cl | THF | CATALYST COMPONENT COMPOSITION (wt. %) Ti | Mg | Cl | Donor Type | % |
|---|---|---|---|---|---|---|---|---|---|---|---|---|
| 2 cfr | SiO$_2$ | — | MgCl$_2$ | 3 | 4.3 | 12.5 | 9.0 | 4.5 | 4.0 | 22.6 | DIBP[1] | 7.4 |
| 14 | " | — | " | 12 | 8.0 | 23.4 | 30.6 | 4.0 | 9.8 | 37.1 | " | 8.5 |

[1]DIBP = diisobutylphthalate

EXAMPLE 14 AND COMPARATIVE EXAMPLE 2

The synthesis of the catalyst component in Example 14 and comparative example 2, is carried out as in Example 3 and comparative Example 1 respectively, except that the electron-donor compound is diisobutylphthalate (DIBP) instead of 2-isopropyl-2-isopentyl-1,3-dimethoxypropane.

The composition of the support after impregnation and the one of the catalyst component are reported in Table 3A.

The polymerization is carried out as in Example 1, but in the presence of diphenyldimethoxysilane (DPMS) as a stereoregulating agent (molar ratio DPMS/TEA=0.05). The results are shown in Table 3B.

TABLE 1B

POLYMERIZATION OF PROPYLENE

| Ex. No. | Catalyst component (mg) | Polymer (g) | Yield (kg.pol/ g.cat.comp | Cl residue (ppm) | Insol. in xylene (% wt.) | MIL. (dg/min) | Tamped bulk density (g/cm$^3$) | Morphology |
|---|---|---|---|---|---|---|---|---|
| 1 | 20.2 | 550 | 25.0 | 11.2 | 97.6 | 5.9 | 0.43 | Spheroidal |
| 2 | 18.0 | 558 | 31.0 | 10 | 97.4 | 3.9 | 0.42 | " |
| 3 | 19.5 | 663 | 34.0 | 10.2 | 98.4 | 3.9 | 0.46 | " |
| 4 | 13.0 | 481 | 37.0 | 9.6 | 95.0 | 12.1 | 0.41 | " |
| 5 | 15.7 | 598 | 38 | 10 | 97.8 | 4.7 | 0.38 | Irregular |
| 6 | 12 | 396 | 33.0 | 11 | 96.0 | 7.5 | 0.37 | Spheroidal |
| 7 | 15 | 510 | 34 | n.d.[1] | 97.0 | 6.1 | 0.44 | " |

[2]n.d. = not determined

TABLE 2B

POLYMERIZATION OF PROPYLENE

| Ex. No. | Catalyst component (mg) | Polymer (g) | Yield (kg.pol/ g.cat.comp | Cl residue (ppm) | Insol. in xylene (% wt.) | MIL. (dg/min) | Tamped bulk density (g/cm$^3$) | Morphology |
|---|---|---|---|---|---|---|---|---|
| 8 | 20 | 440 | 22.0 | 16 | 95.4 | 15 | 0.42 | Spheroidal |
| 9 | 16.5 | 450 | 27.3 | 14 | 95.1 | 12 | 0.32 | Irregular |
| 10 | 15 | 372 | 24.8 | 14 | 96.0 | 10.5 | 0.425 | Spheroidal |
| 11 | 18 | 369 | 20.5 | 18 | 94.5 | 11.5 | 0.41 | " |
| 12 | 18 | 400 | 22.3 | 16 | 95.5 | 8.2 | 0.38 | " |
| 13 | 20 | 412 | 20.6 | 15.5 | 97.5 | 4.7 | 0.45 | " |
| 1 cfr | 16 | 189 | 11.8 | 20 | 97 | 5.3 | 0.447 | " |

TABLE 3B

| | POLYMERIZATION OF PROPYLENE | | | | | | | |
|---|---|---|---|---|---|---|---|---|
| Ex. No. | Catalyst component (mg) | Polymer (g) | Yield (kg.pol/ g.cat.comp | Cl residue (ppm) | Insol. in xylene (% wt.) | MIL. (dg/min) | Tamped bulk density (g/cm$^3$) | Morphology |
| 14 | 20 | 406 | 20.3 | 17.5 | 96.8 | 4.9 | 0.43 | Spheroidal |
| 2 cfr | 25 | 224 | 9 | 19 | 97.0 | 5.8 | 0.42 | Spheroidal |

EXAMPLE 15

In a 2000 ml stainless steel autoclave, equipped with an anchor agitator, are introduced in vacuum at 65° C. a suspension containing, in 1000 ml of anhydrous n heptane, 5 mmoles of Al(i-C$_4$H$_9$)$_3$ and 52 mg of the catalyst component prepared in Example 1. Then are introduced 4 atm of hydrogen and enough ethylene to bring the total pressure to 11 atm.

The content is polymerized at 70° C. for 2 hours continuing to feed the monomer in order to maintain a constant pressure. After filtration and drying, 270 g of polymer are isolated, obtaining a yield of 5190 g PE/g catalyst component. The polymer has an intrinsic viscosity equal to 1.9 dl/g and the value of the F/E degrees ratio is 30.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A catalyst component for the polymerization of olefins obtained by reacting a tetravalent titanium halide or halogen alcoholate and an electron-donor compound with a solid comprising a porous metal oxide containing hydroxyl groups on the surface, on which is supported a Mg dihalide or a Mg compound which does not contain Mg—C bonds and can be transformed into a dihalide, characterized in that the amount of Mg supported on the oxide, before the reaction with the Ti compound, and present in the final catalyst component after the reaction with the Ti compound, is from 5 to 12% by weight with respect to the weight of the catalyst component.

2. The component of claim 1, wherein the metal oxide is selected from the group consisting of silica, alumina and mixed silica-alumina oxides.

3. The component of claim 2, wherein the metal oxide is silica and it contains, besides the hydroxyl groups, chemically uncombined water in quantity up to 0.015 moles per g of oxide.

4. The component of claim 1, wherein the Ti compound is TiCl$_4$ and the electron-donor compound is selected from the diethers of formula

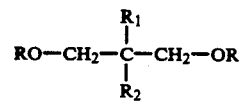

where R, R$_1$ and R$_2$ are the same or different and are C$_1$-C$_{18}$ linear or branched alkyl, C$_3$-C$_{18}$ cycloalkyl, C$_6$-C$_{18}$ aryl, C$_7$-C$_{18}$ alkaryl or aralkyl radicals, and R$_1$ or R$_2$ can also be hydrogen.

5. The component of claim 4, wherein R is methyl, and R$_1$ and R$_2$ are the same or different and are ethyl, propyl, isopropyl, butyl, isobutyl, tert-butyl, neopentyl, isopentyl, phenyl, benzyl or cyclohexyl.

6. The component of claim 4, wherein the Mg/Ti ratio is from 0.5:1 to 30:1 and the Ti/electron-donor compound molar ratio is from 0.3:1 to 8:1.

7. The component of claim 2, wherein the Ti compound is TiCl$_4$ and the electron-donor compound is selected from the diethers of formula

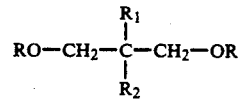

where R, R$_1$ and R$_2$ are the same or different and are C$_1$-C$_{18}$ linear or branched alkyl, C$_3$-C$_{18}$ cycloalkyl, C$_6$-C$_6$-C$_{18}$ C$_7$-C$_{18}$ alkaryl or aralkyl radicals, and R$_1$ or R$_2$ can also be hydrogen.

8. The component of claim 2, wherein the Ti compound is TiCl$_4$ and the diether is selected from those where R is methyl and R$_1$ and R$_2$, same or different, are ethyl, propyl, isopropyl, butyl, isobutyl, tert-butyl, neopentyl, isopentyl, phenyl, benzyl or cyclohexyl

* * * * *

UNITED STATES PATENT AND TRADEMARK OFFICE
CERTIFICATE OF CORRECTION

PATENT NO. : 5,244,854
DATED : September 14, 1993
INVENTOR(S) : Luciano Noristi et al It is certified that error appears in the above-identified patent and that said Letters Patent is hereby corrected as shown below:

col. 2, line 38, change "04" to --0.4--.

col. 6, line 11, change "Altriethyl" to --Al-triethyl--.

col. 7, line 12, change "MqCl$_2$" to --MgCl$_2$--.

col. 7, line 48, change "13" to --1:3--.

col. 9, line 21, change "60.C" to --60°C--.

col. 9, line 22, change C2H5OH" to --C$_2$H$_5$OH--.

col. 9, line 24, change "60.C" to --60°C--.

At col. 14, line 47, change "C$_6$-C$_6$-C$_{18}$ C$_7$-C$_{18}$" to --C$_6$-C$_{18}$ aryl, C$_7$-C$_{18}$--.

Signed and Sealed this

Twenty-second Day of March, 1994

Attest:

BRUCE LEHMAN

*Attesting Officer*     *Commissioner of Patents and Trademarks*